(12) United States Patent
Lu et al.

(10) Patent No.: US 10,469,910 B2
(45) Date of Patent: Nov. 5, 2019

(54) METHODS FOR SUPPLYING, ORDERING, AND TRANSACTING ITEMS BASED ON MOTION IMAGES

(71) Applicant: Wistron Corporation, New Taipei (TW)

(72) Inventors: Kuo-Hsien Lu, New Taipei (TW); Yu-Yen Chen, New Taipei (TW); Yen-Kai Chiu, New Taipei (TW)

(73) Assignee: Wistron Corporation, New Taipei (TW)

( * ) Notice: Subject to any disclaimer, the term of this patent is extended or adjusted under 35 U.S.C. 154(b) by 191 days.

(21) Appl. No.: 15/677,011

(22) Filed: Aug. 15, 2017

(65) Prior Publication Data

US 2018/0302683 A1    Oct. 18, 2018

(30) Foreign Application Priority Data

Apr. 12, 2017 (TW) .............................. 106112203 A (51) Int. Cl.
*H04N 21/478* (2011.01)
*H04N 21/44* (2011.01)
(Continued)

(52) U.S. Cl.
CPC ... *H04N 21/47815* (2013.01); *G06Q 30/0633* (2013.01); *H04N 21/2353* (2013.01);
(Continued)

(58) Field of Classification Search
CPC .............. H04N 21/478; H04N 21/435; H04N 21/23418; H04N 21/2353;
(Continued)

(56) References Cited

U.S. PATENT DOCUMENTS 6,089,191 A * 7/2000 Calinski ................. A01K 61/70
119/221
6,313,843 B1 * 11/2001 Tanii ..................... A63F 13/005
345/473
(Continued)

FOREIGN PATENT DOCUMENTS

CN        104375778        2/2015

OTHER PUBLICATIONS

"Office Action of Taiwan Counterpart Application," dated Mar. 12, 2018, p. 1-p. 8, in which the listed reference was cited.

*Primary Examiner* — Fernando Alcon
*Assistant Examiner* — Alan H Luong
(74) *Attorney, Agent, or Firm* — JCIPRNET (57) ABSTRACT

Methods for supplying, ordering, and transacting items based on motion images are proposed. The methods are applicable to a server and include the following steps. A first video stream is received from a first electronic device, and at least one item is identified from the first video stream to generate a frame and a tag associated with each item. An editing operation on a first tag is received from the first electronic device to generate first tag data. The first tag and the first frame are combined into the first video stream to generate a composite video stream. The composite video stream is transmitted to a second electronic device. In response to an ordering operation detected on the first item from the second electronic device, first ordering data is generated according to the first tag data to add the first item into an order list of the second electronic device.

20 Claims, 10 Drawing Sheets (51) Int. Cl.
*G06Q 30/06* (2012.01)
*H04N 21/435* (2011.01)
*H04N 21/234* (2011.01)
*H04N 21/235* (2011.01)
*H04N 21/472* (2011.01)
*H04N 21/4725* (2011.01)
*H04N 21/81* (2011.01)
*H04N 21/84* (2011.01)
*H04N 21/8545* (2011.01)
*H04L 29/08* (2006.01)

(52) U.S. Cl.
CPC ..... *H04N 21/23418* (2013.01); *H04N 21/435* (2013.01); *H04N 21/44* (2013.01); *H04N 21/4725* (2013.01); *H04N 21/47205* (2013.01); *H04N 21/812* (2013.01); *H04N 21/84* (2013.01); *H04N 21/8545* (2013.01); *H04L 67/26* (2013.01)

(58) Field of Classification Search
CPC ......... H04N 21/47205; H04N 21/4725; H04N 21/812; H04N 21/8545; H04N 21/47815; H04N 21/44; H04N 21/84; G06Q 30/06
USPC ............... 725/37, 60; 382/103, 173, 201
See application file for complete search history.

(56) References Cited

U.S. PATENT DOCUMENTS

| | | | |
|---|---|---|---|
| 6,357,042 B2 * | 3/2002 | Srinivasan | G11B 27/031 375/E7.008 |
| 2002/0078446 A1 * | 6/2002 | Dakss | H04N 1/64 725/37 |
| 2003/0018536 A1 * | 1/2003 | Eggebraaten | G06Q 30/06 705/26.81 |
| 2009/0175538 A1 * | 7/2009 | Bronstein | G06K 9/00758 382/173 |
| 2010/0058397 A1 * | 3/2010 | Rogers | G06Q 30/02 725/60 |
| 2010/0299199 A1 * | 11/2010 | Kang | G06Q 30/0251 705/14.49 |
| 2012/0045093 A1 | 2/2012 | Salminen et al. | |
| 2012/0167146 A1 * | 6/2012 | Incorvia | H04N 21/234318 725/60 |
| 2015/0296250 A1 * | 10/2015 | Casper | H04N 21/4316 725/34 |
| 2016/0381427 A1 * | 12/2016 | Taylor | G06Q 30/00 725/13 |

* cited by examiner

METHODS FOR SUPPLYING, ORDERING, AND TRANSACTING ITEMS BASED ON MOTION IMAGES

CROSS-REFERENCE TO RELATED APPLICATION

This application claims the priority benefit of Taiwan application serial no. 106112203, filed on Apr. 12, 2017. The entirety of the above-mentioned patent application is hereby incorporated by reference herein and made a part of this specification.

TECHNICAL FIELD

The disclosure relates methods for supplying, ordering, and transacting items, in particular to, methods for supplying, ordering, and transacting items based on motion images.

BACKGROUND

As the development of e-commerce has advanced tremendously, more sellers tend to start up virtual stores at e-commerce platforms instead of physical ones. Online shopping has become one of the most preferred ways to make purchases due to its convenience and 24/7 availability.

The conventional transaction of online shopping is to provide one or more still images of a merchandize along with its description for the buyers. In some instances, a video of a merchandise is also provided so that buyers may be able to view the merchandize from different view angles, shades, and distances. However, none of the existing e-commerce platforms has allowed buyers to interact with the video for transaction.

SUMMARY OF THE DISCLOSURE

Accordingly, the methods for supplying, ordering, and transacting items based on motion images are provided in the disclosure, where an ordering end user would be able to view motion images and related information of items provided by a supplier and place an order directly through the motion images in a more intuitive and convenient fashion.

According to one of the exemplary embodiments, the method for supplying items is applicable to a server communicated with a first electronic device and a second electronic device and includes the following steps. A first video stream is received from the first electronic device, and all items are identified from the first video stream to generate a frame and a tag associated with each of the items, where the items are living species and include a first item, and the first item is associated with a first tag and a first frame respectively. An editing operation performed on a first tag is received from the first electronic device to generate first tag data. The first tag and the first frame are combined into the first video stream to generate a composite video stream. The composite video stream is transmitted to the second electronic device to provide the second electronic device to order the first item through the composite video stream.

According to one of the exemplary embodiments, the method for ordering items is applicable to a server communicated with a first electronic device and a second electronic device and includes the following steps. A composite video stream is transmitted to the second electronic device, where the composite video steam is generated by identifying a first item from a first video stream provided by the first electronic device to generate a first frame and a first tag having first tag data followed by associating and combining the first frame and the first tag into the first video stream, and the first item is a living species. In response to an ordering operation performed on the first item by the second electronic device being detected, first ordering data is generated according to the first tag data so as to add the first item to an order list of the second electronic device.

According to one of the exemplary embodiments, the method for transacting items is applicable to a server communicated with a first electronic device and a second electronic device and includes the following steps. A first video stream is received from the first electronic device, and all items are identified from the first video stream to generate a frame and a tag associated with each of the items, where the items are living species and include a first item, and the first item is associated with a first tag and a first frame respectively. An editing operation performed on a first tag is received from the first electronic device to generate first tag data. The first tag and the first frame are combined into the first video stream to generate a composite video stream. The composite video stream is transmitted to the second electronic device. In response to an ordering operation performed on the first item by the second electronic device being detected, first ordering data is generated according to the first tag data so as to add the first item to an order list of the second electronic device.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Figure 1:
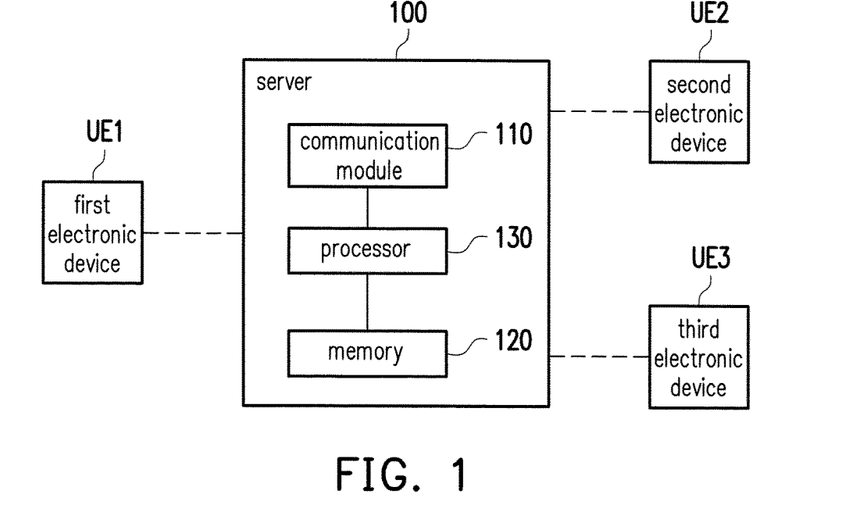
FIG. 1 illustrates a block diagram of a server in accordance with an exemplary embodiment of the disclosure.

FIG. 1 illustrates a block diagram of a server in accordance with an exemplary embodiment of the disclosure. All components of the server and their configurations are first introduced in FIG. 1. The functionalities of the components are disclosed in more detail in conjunction with FIG. 2.

Referring to FIG. 1, a server 100 would include a communication module 110, a memory 120, and a processor 130, where the processor 130 would be coupled to the communication module 110 and the memory 120. In the present exemplary embodiment, the server 100 may be a computer system having computing capability such as an application server, a cloud server, a database server, a workstation, and so forth. Moreover, the server 100 would provide a platform to interact with other connected user devices (e.g. a first electronic device UE1, a second electronic device UE2, and a third electronic device UE3). It should be noted that, in an exemplary embodiment, the server 100 may be implemented by two separate servers, a frontend server configured to process item supplying and a backend server configured to process item ordering. However, the disclosure is not limited in this regard.

The communication module 110 would be configured to provide the server 100 to be connected with other devices and may be an electronic component such as a wireless network communication chip or antenna with a WiMAX, Wi-Fi, 2G, 3G, 4G standard.

The memory 120 would be configured to store data such as images and programming codes and may one or a combination of a stationary or mobile random access memory (RAM), a read-only memory (ROM), a flash memory, a hard drive, other similar devices or integrated circuits.

The processor 130 would be configured to control the operation among the components of the server 100 and may be, for example, a central processing unit (CPU) or other programmable devices for general purpose or special purpose such as a graphics processing unit (GPU), a microprocessor and a digital signal processor (DSP), a programmable controller, an application specific integrated circuit (ASIC), a programmable logic device (PLD), an application processor (AP), other similar devices or a combination of aforementioned devices.

Detailed steps of how the server 100 performs the proposed methods would be illustrated along with each component hereafter.

Figure 2:
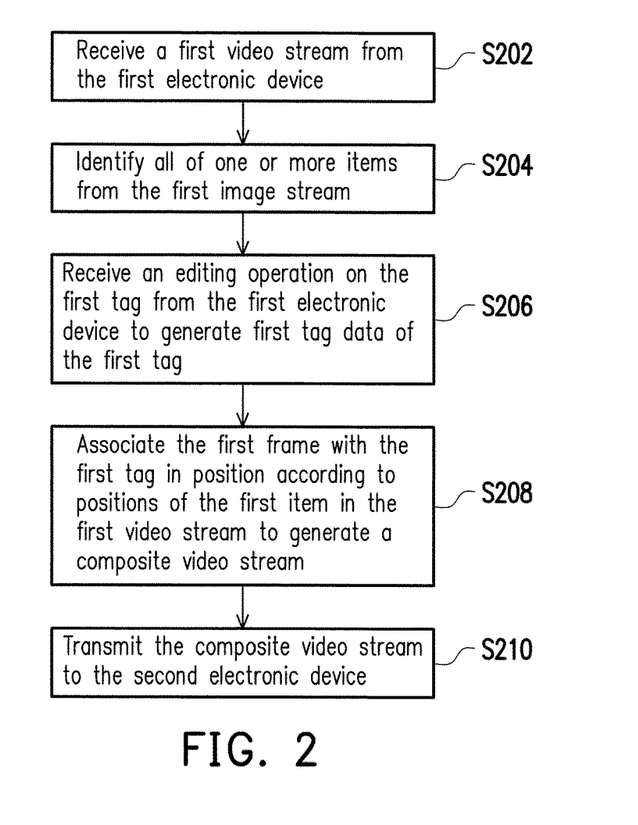
FIG. 2 illustrates a flowchart of a method for supplying items in accordance with an exemplary embodiment of the disclosure.

FIG. 2 illustrates a flowchart of a method for supplying items in accordance with an exemplary embodiment of the disclosure. The steps would be primarily performed between the first electronic device UE1 and the server 100, and thus the first electronic device UE1 would be considered as an item supplier and would upload available items to be ordered in a motion image format. Motion images uploaded by the first electronic device UE1 would be referred to as "a first video stream" hereafter. Also, the supplied items would be living species. For illustrative purposes, the supplied items would be fishes in an aquarium in the following exemplary embodiments.

Referring to both FIG. 1 and FIG. 2, the processor 130 of the server 100 would receive a first video stream from the first electronic device UE1 through the communication module 110 (Step S202), and the processor 130 would identify all of one or more items from the first image stream (Step S204). (Note that in the following description, assume that the items are plural.) In detail, the processor 130 would distinguish objects from the first video stream and identify features of each of the objects so as to extract the items supplied by the first electronic device UE1 from the objects. Image information of the first video stream herein may be color information from a single source or color information and depth information from double sources. The processor 130 would process the first video stream differently based on different sources.

In terms of the color information from a single source, there would be different approaches to distinguish motion objects from static objects. For motion objects, the processor 130 may define a background from information that has not changed throughout images (i.e. non-moving information) by using a background subtraction technique to construct background information. Next, the processor 130 may subtract the background information from a current image to obtain information of the motion objects. For static objects, the processor 130 may define blocks with similar color or texture as a same object. Moreover, after the processor 130 construct the background information, it may perform binarization, dilation, erosion, and/or denoise on the images to speed up the object distinguishment and identification processes.

Figure 3A:
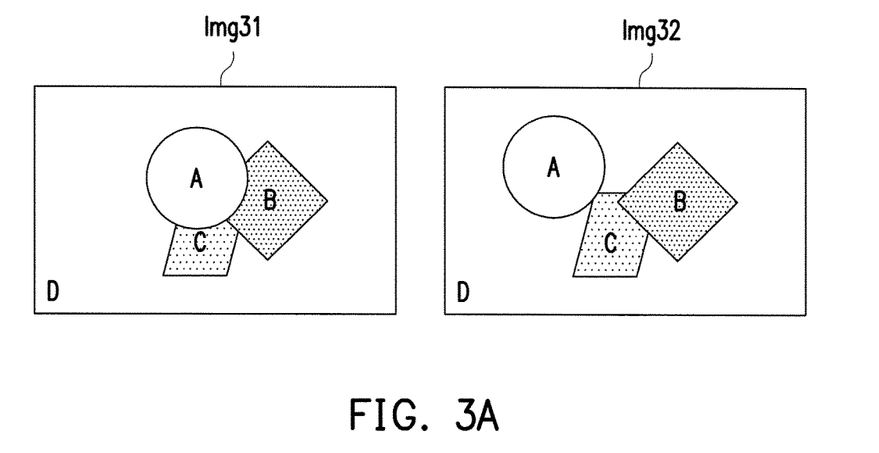
FIG. 3A illustrate color images in accordance with an exemplary embodiment of the disclosure.

For example, FIG. 3A illustrate a color image Img31 and a color image Img32 in accordance with an exemplary embodiment of the disclosure, where the two color images are from a same video stream but correspond to different time points. Herein, only an object A is located at different positions in the two color images, and thus the object A is a motion object while objects B, C, and D are static objects. The processor 130 may distinguish the object A from others by using a background subtraction technique and further distinguish among the objects B, C, D based on color and texture information. Note that although the object D is a background, the processor 130 would still define it as an object. After the processor 130 distinguishes among the different objects, it may identify and store features of each of the objects in the memory 120, where the features may be, for example, silhouette, color, texture, and so forth.

Figure 3B:
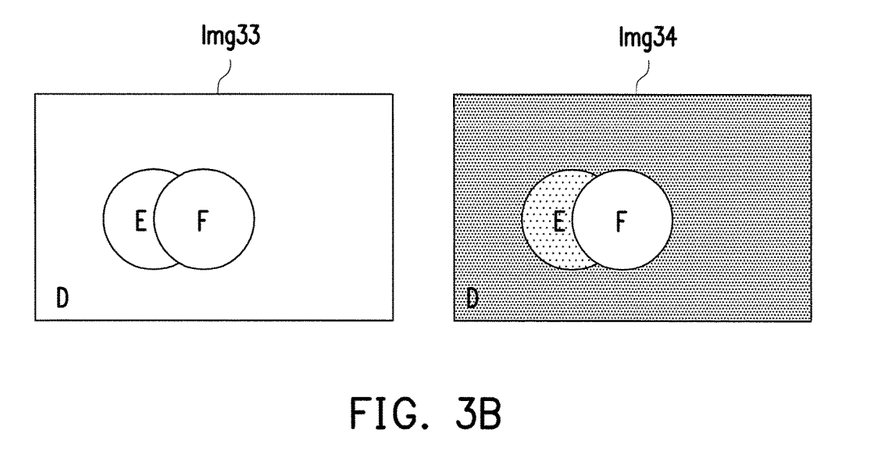
FIG. 3B illustrate a color image and a depth image in accordance with an exemplary embodiment of the disclosure.

In terms of the color information and the depth information from double sources, the processor 130 may define separate objects with different depths as different objects. For example, FIG. 3B illustrate a color image Img33 and a depth image Img34 in accordance with an exemplary embodiment of the disclosure. The processor 130 would not be able to determine whether an object E and an object F are two separate objects or a same object only based on the color image Img33. However, the processor 130 would able to determine that the object F is a near object and the object E is a far object based on the depth image Img34. The depth information could only provide differences in depth distances but could not provide features of the objects. Hence, after the processor 130 distinguishes among different objects, it would identify features of each of the objects based on the color image Img 33 and store them in the memory 120, where the features may also be, for example, silhouette, color, texture, and so forth.

Referring back to FIG. 2, after the processor 130 identifies all the items in Step S204, it would generate an interactive frame that belongs to and represents each of the identified items as well as an editable tag that corresponds to each of the frames, where the interactive frame is large enough to surround each of the identified items at a region thereof (normally referred to as "a region of interest" (ROI)) and maybe either visible or invisible. The processor 130 would next transmit the first video stream, all the corresponding frames and tags to the first electronic device UE1 so as to allow the item supplier to select any of the items for tag editing. Assume that the processor 130 detects a selection operation performed on any of the items by the first electronic device UE1, and the selected item and its corresponding tag and frame would be referred to as "a first item", "a first tag", and "a first frame" respectively. The processor 130 would then provide and receive an editing operation performed on the first tag from the first electronic device UE1 to generate first tag data of the first tag (Step S206). In other words, after the first electronic device UE1 selects the first item, the processor 130 would allow the first electronic device UE1 to fill in or amend content of the first tag. The first tag data may include a name and a related description of the first item in a text format or an image file format, and the filled-in or amended content of the first tag would be the first tag data. After the processor 130 receives the first tag data, it would associate the first tag data with the first tag and the features of the first item and store such information in the memory 120.

Next, the processor 130 would associate the first frame with the first tag in position according to positions of the first item in the first video stream (i.e. define positions of the first frame and the first tag of each image in the first video stream) to generate a composite video stream (Step S208). In detail, the processor 130 may locate the first item in the first video stream according to the features of each of the identified items and further record a moving trajectory of the first item in the first video stream. The purpose of recording the moving trajectory is to provide an additional axillary element for item identification without confusion due to similar appearance. Next, the processor 130 would locate the first tag and the first frame according to the features and the moving trajectory of the first item so as to control the first tag and the first frame to move along with the first item as well as to combine the first tag and the first frame into the first video stream. Herein, the first tag would be at least close to the first item (e.g. nearby, neighboring, partially overlapped or entirely overlapped with the first item or the corresponding first frame).

From another perspective, the first frame would be located on the top layer of the composite video stream, and the first tag would also be located on the top layer of the composite video stream and move along with the first frame, where the first tag would be at a fixed distance away from the first frame, e.g. close to the top left corner or the top right corner of the first frame. It should be noted that, since all of the items are living species, they may be obstructed by other objects during movement. Hence, when a portion or an entire of the first item disappears from a specific frame of the first video stream such that the processor 130 is not able to identify the first item, the processor 130 would set the positions of the first tag and the first frame in the specific image to where they are in a previous image (i.e. the positions which they are most recently identified). When the first item entirely reappears in another specific image, the processor 130 would set the first tag and the first frame to be close to or overlapped with the first item.

Figure 4:
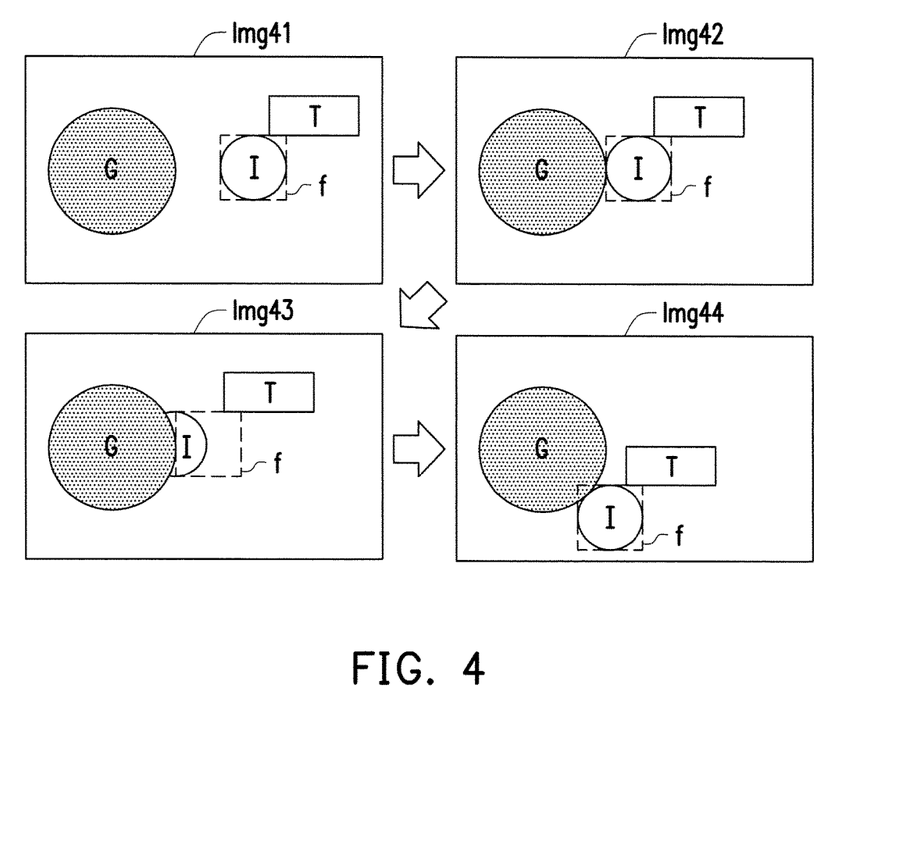
FIG. 4 illustrates a schematic diagram of an approach of setting positions of tags and frames in accordance with an exemplary embodiment of the disclosure.

For example, FIG. 4 illustrates a schematic diagram of an approach of setting positions of tags and frames in accordance with an exemplary embodiment of the disclosure.

Referring to FIG. 4, assume that in an image Img41, an item I includes a tag T and a frame f, where the tag T is at the top right of the item I, and the frame f surrounds the item I. In an image Img42, as the item I is moving toward an object G, the tag T and the frame f are also moving with a same trajectory. In an image Img43, when the item I moves behind the object G, the tag T and the frame f would be at same positions as they are in the previous image. When the item I reappears entirely in an image Img44, the tag T would be at the top right of the item I again, and the frame f would be back to where it would be able to surround the item I.

Referring back to FIG. 2, after the processor 130 generates the composite video stream, the communication module 110 would transmit the composite video stream to the second electronic device UE2 (Step S210) to provide an ordering end user to order the items through the composite video stream by connecting his/her electronic device to the server 100.

FIG. 5A-FIG. 5E illustrate a scenario diagram of a method for supplying items in accordance with an exemplary embodiment of the disclosure. In the present exemplary embodiment, a user of the first electronic device UE1 would be considered as a seller whose items selling on a shopping platform provided by the server 100 are pet fishes. At least one camera would be configured in front of an aquarium for filming, where a field of view of the camera would include the entire aquarium. In other words, the captured video would be a video with an entire view of the aquarium. The lens of the camera may be a RGB color lens that only obtains color information, or may be a depth lens that obtains both depth information and color information.

Next, the electronic device UE1 would obtain and upload the video captured by the camera onto the server 100. The length of the uploaded video may be decided by the seller, and an upper limit (e.g. 10 minutes) and a lower limit (e.g. 1 minute) of the length of the uploaded video may be decided by the shopping platform.

Figure 5A:
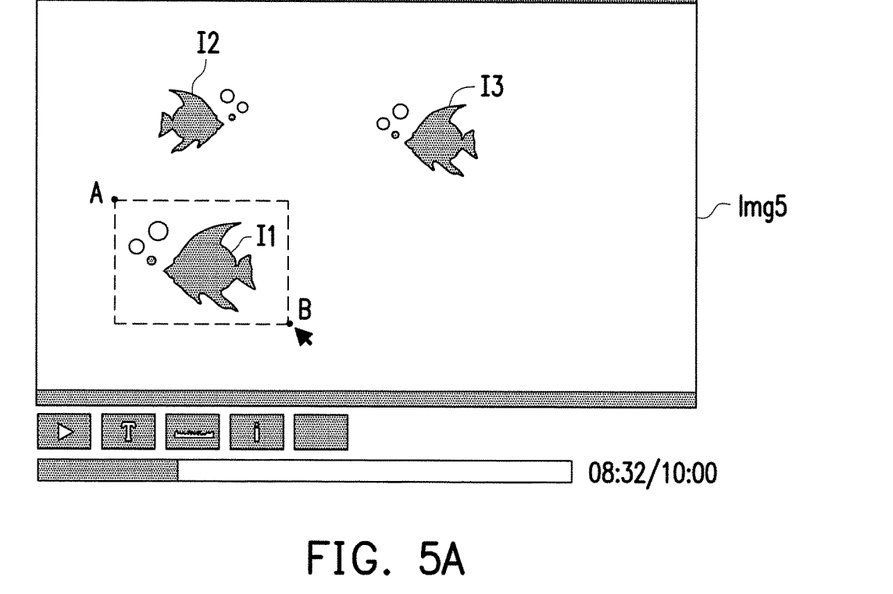
FIG. 5A-FIG. 5E illustrate a scenario diagram of a method for supplying items in accordance with an exemplary embodiment of the disclosure.
Figure 5B:
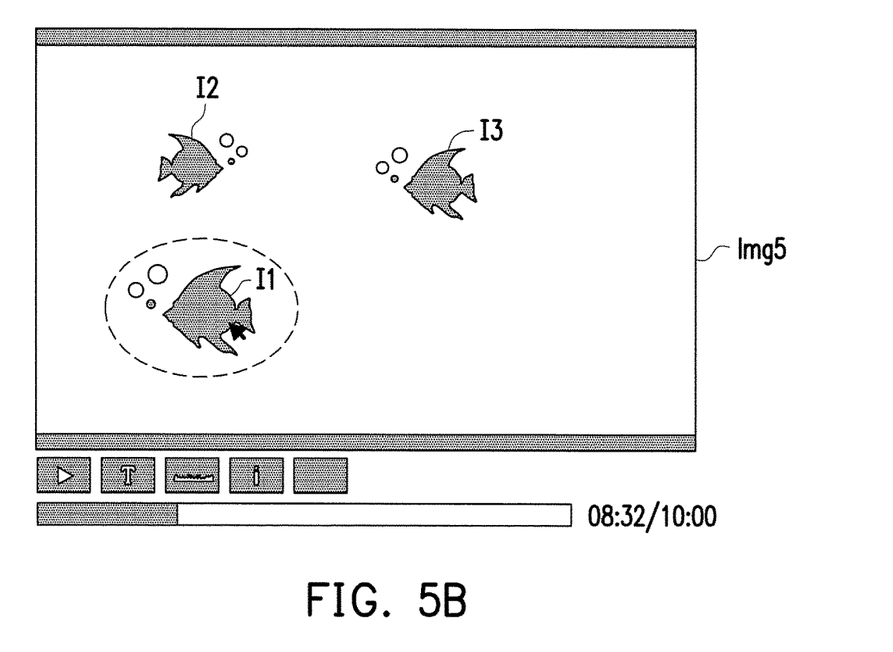
Figure 5C:
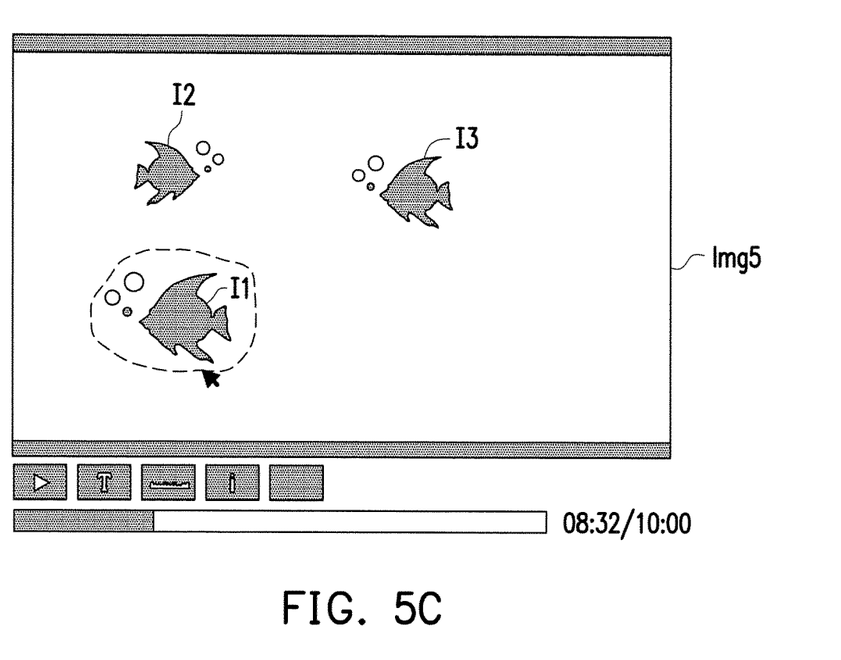

Referring first to FIG. 5A, after the server 100 obtains the uploaded video and identify pet fishes I1-I3, it may generate an invisible frame at a region where each of the pet fishes I1-I3 is located. The seller may be able to watch the video on the first electronic device UE1 and select any of the pet fishes I1-I3 for tag editing. For example, Img5 is an image of the uploaded video being played at 8 min 32 sec. Meanwhile, the seller may use an input module (not shown, e.g. a touch screen, a mouse, a keyboard) of the first electronic device UE1 to select the pet fish I1 by dragging from a fixed point A to a fixed point B, by clicking on the pet fish I1 as illustrated in FIG. 5B, or by drawing a surrounding circle as illustrated by FIG. 5C. After the pet fish I1 is selected, a tag would be shown aside for the seller to fill in or amend tag information.

It should be noted that, the first electronic device UE1 that performs tag editing and the first electronic device UE1 that obtains and uploads the video may be same or different electronic devices. In fact, any electronic device owned by or authorized to a same seller, or any electronic device provides services for a same seller to log into the server 100 are included in the definition of the first electronic device UE1.

Figure 5D:
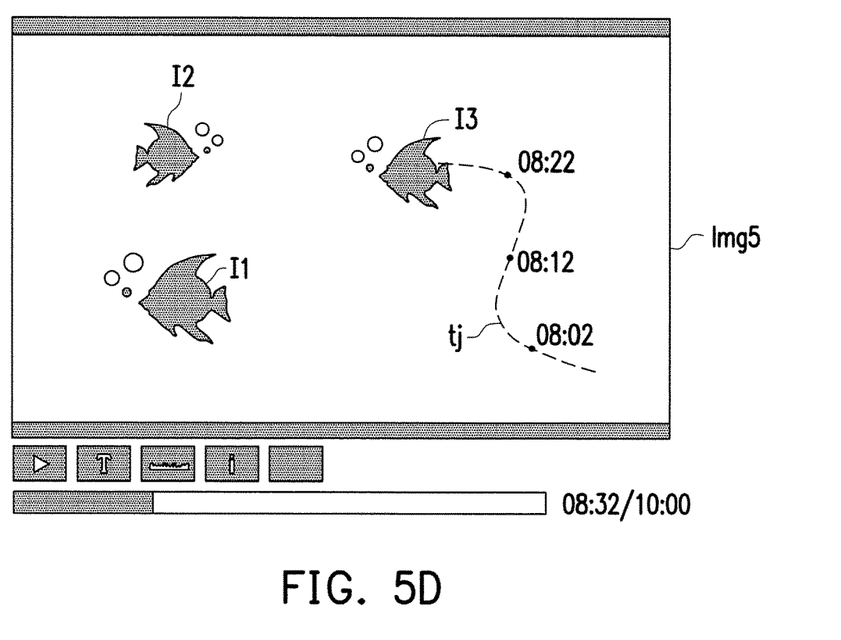
Figure 5E:
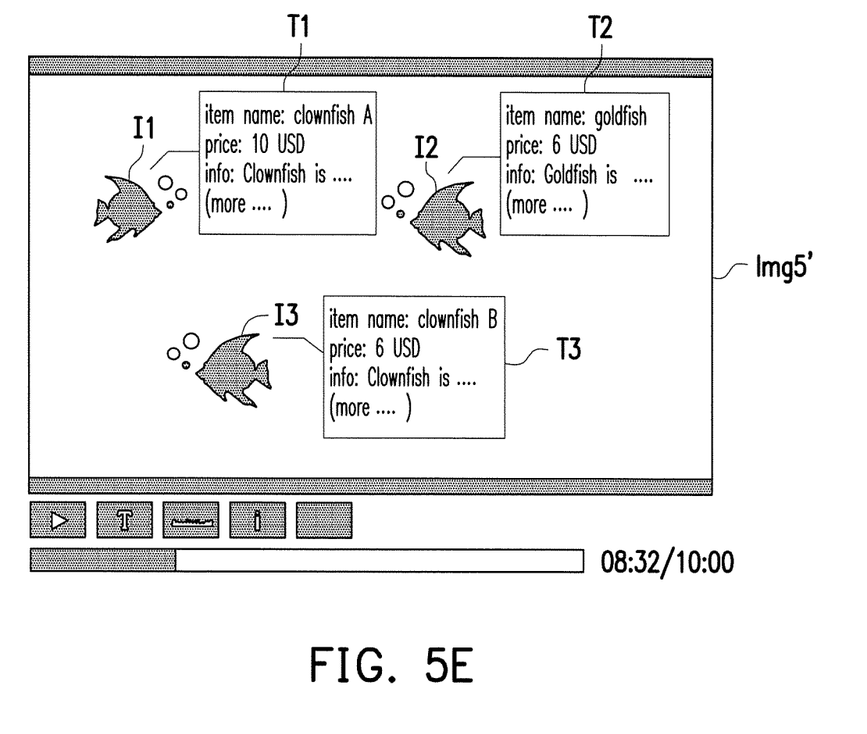

After the first electronic device UE1 finishes editing all the tag information, it would transmit the tag information of the pet fishes I1-I3 input by the seller to the server 100, and the server 100 would associate the received tag information with the pet fishes I1-I3. Moreover, the server 100 would record a moving trajectory of each of the pet fishes I1-I3 such as a moving trajectory tj of the pet fishes I3 as illustrated in FIG. 5D. Next, the server 100 would transmit a composite video stream combined by the video, frames, and tags to the buyer's electronic device (e.g. the second electronic device UE2) upon the buyer's demand. As illustrated in FIG. 5E, the buyer would see the pet fishes I1-I3 and their tags T1-T3 on an image Img5' of the composite video stream played at 8 min 32 sec, where tag contents would be names, prices, and related information of the pet fishes I1-I3.

Figure 6:
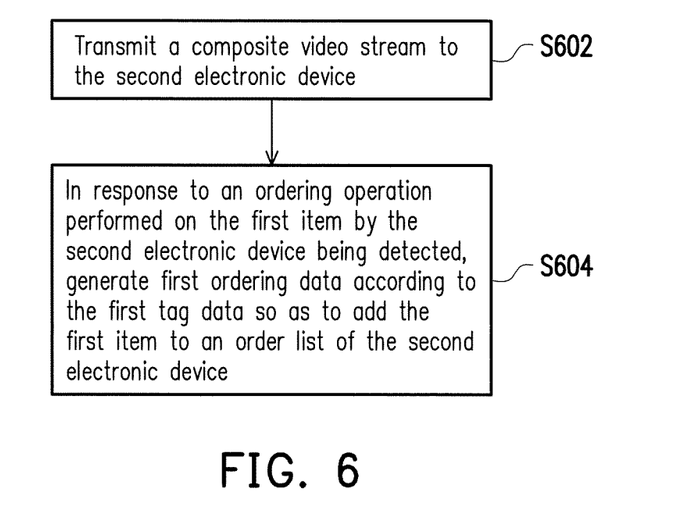
FIG. 6 illustrates a flowchart of a method of ordering items in accordance with an exemplary embodiment of the disclosure.

Following the flow in FIG. 2, FIG. 6 illustrates a flowchart of a method of ordering items in accordance with an exemplary embodiment of the disclosure. The flow in FIG. 6 represents an interaction between the second electronic device UE2 and the server 100 after the server 100 generates the composite video stream, and thus the second electronic device UE1 may be considered as an item ordering end.

Referring to both FIG. 1 and FIG. 6, the buyer would visit the server 100 and request for permission by using the second electronic device UE2. After the processor 130 of the server 100 verifies the buyer's identity for permission (public visiting without any authorization or semi-public visiting with limitation may be provided in other exemplary embodiments), it would transmit the composite video stream generated in FIG. 2 to the second electronic device UE2 through the communication module 110 (Step S602) to provide the second electronic device UE2 to order the items provided by the first electronic device UE1. In another exemplary embodiment, the server 100 may push the composite video stream to all buyers or those enrolled in the service.

As described above, each of the items, including the first item, in the composite video stream includes a corresponding tag and frame. The interaction between the second electronic device UE2 representing the item ordering end and the tags as well as the frames in the composite video stream may be described by schematic diagrams illustrated in FIG. 7A and FIG. 7B in accordance with an exemplary embodiment of the disclosure.

Figure 7A:
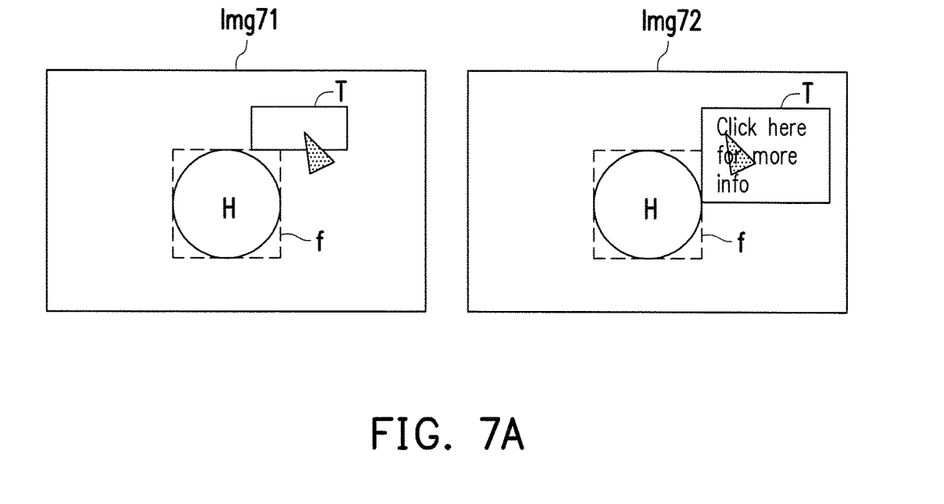
FIG. 7A and FIG. 7B illustrate a scenario of ordering items in accordance with an exemplary embodiment of the disclosure.

Referring first to FIG. 7A, assume that when the second electronic device UE2 displays an image Img71 of a composite video stream, the user of the second electronic device UE2 perform is a selecting operation on a tag T of an item H (e.g. by clicking on the tag T or the item H, or by moving a cursor to where the tag T or the item H is located). Assume that a portion of tag information such as a name has been shown on the tag T. When the processor 130 of the server 100 detects the selecting operation performed on the tag T by the second electronic device UE, it would transmit other portion of the tag information of the tag T to the second electronic device UE2. The composite video stream displayed on the second electronic device UE2 would then be, for example, an image 72.

Figure 7B:
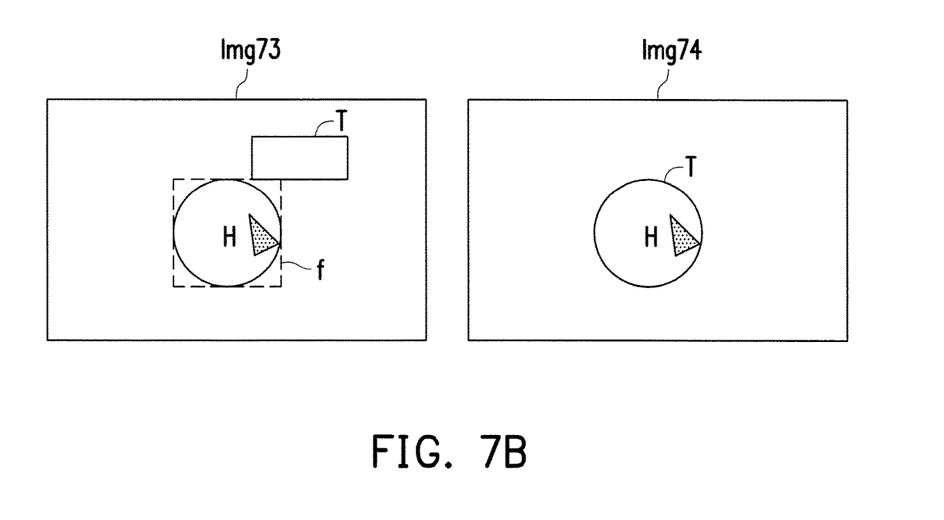

Next, referring to FIG. 7B, assume that when the second electronic device UE2 displays an image Img73 of the composite image stream, the user of the second electronic device UE2 performs a selecting operation on an item H (e.g. by clicking or long-clicking on the item H or by clicking on a right button of the mouse), where the selecting operation is an ordering operation performed on the item H. Meanwhile, the processor 130 would temporarily remove the frame f and the tag T from the composite video stream, and the composite video stream displayed on the second electronic device UE2 would then be, for example, an image Img74. In an exemplary embodiment, the processor 130 would transmit a confirmation message to the second electronic device UE2 by using the communication module 110 to make sure whether the item H is intentionally or accidentally selected. When the processor 130 receives a confirmed signal from the second electronic device UE2, it would delete the association among the features, the frame, and the tag of the item H. On the other hand, when the processor 130 receives a denied signal from the second electronic device UE2 through the communication module 110, it would again display the tag T in the composite video stream.

Referring back to FIG. 6, in response to an ordering operation performed on the first item by the second electronic device UE2 being detected, the processor 130 would generate first ordering data according to the first tag data so as to add the first item to an order list of the second electronic device UE2 (Step S604). In detail, when the processor 130 detects the ordering operation performed on the first item by the second electronic device UE2, it would convert the first tag information stored in the memory 120 and information related to the ordering operation to the first ordering data that satisfies a data format of the ordering list. For example, the first ordering data may be in a XML data format and include, for example, member data of the user of the second electronic device UE2, video information, and name, price, related information, a link of a snapshot, a snapshot time of the first item. Such information would appear on the ordering list of the second electronic device UE2. In other words, the first item would be now added to the ordering list.

Moreover, assume that there are two or more ordering end users at the same time. A scenario of two ordering end users (e.g. the second electronic device UE2 and the third electronic device UE3 in FIG. 1) would be illustrated herein, and three or more ordering end users may be deduced in a similar fashion. In detail, the server 100 may set a time limit and a selection limit additionally.

Also as an example of the first item, assume that the second electronic device UE2 has added the first item to an order list. While transmitting the composite video stream to the third electronic device UE3, the server 100 would not allow the third electronic device UE3 to perform any ordering operation on the first item. In other words, the first tag and the first frame would be temporarily removed. Moreover, the processor 130 would start counting down an allowed time, such as 5 minutes, of the first item being added to the order list. During the countdown (i.e. during the allowed time), a prompt message, such as a countdown time, texts, flash light, would be displayed in the composite video stream transmitted to the second electronic device UE2 and the third electronic device UE3.

During the countdown, when the processor 130 detects a cancellation operation performed on the first item by the second electronic device UE2, it would remove the first item from the order list of the second electronic device UE2, remove the prompt message from the composite video stream, and allow the third electronic device UE3 to order the first item.

Assume that the processor 130 has not yet received the order list sent out from the second electronic device UE2 by the end of the countdown (i.e. the allowed time ends), it would remove the first item from the order list of the second electronic device UE2 and allow the third electronic device UE3 to order the first item.

Figure 8:
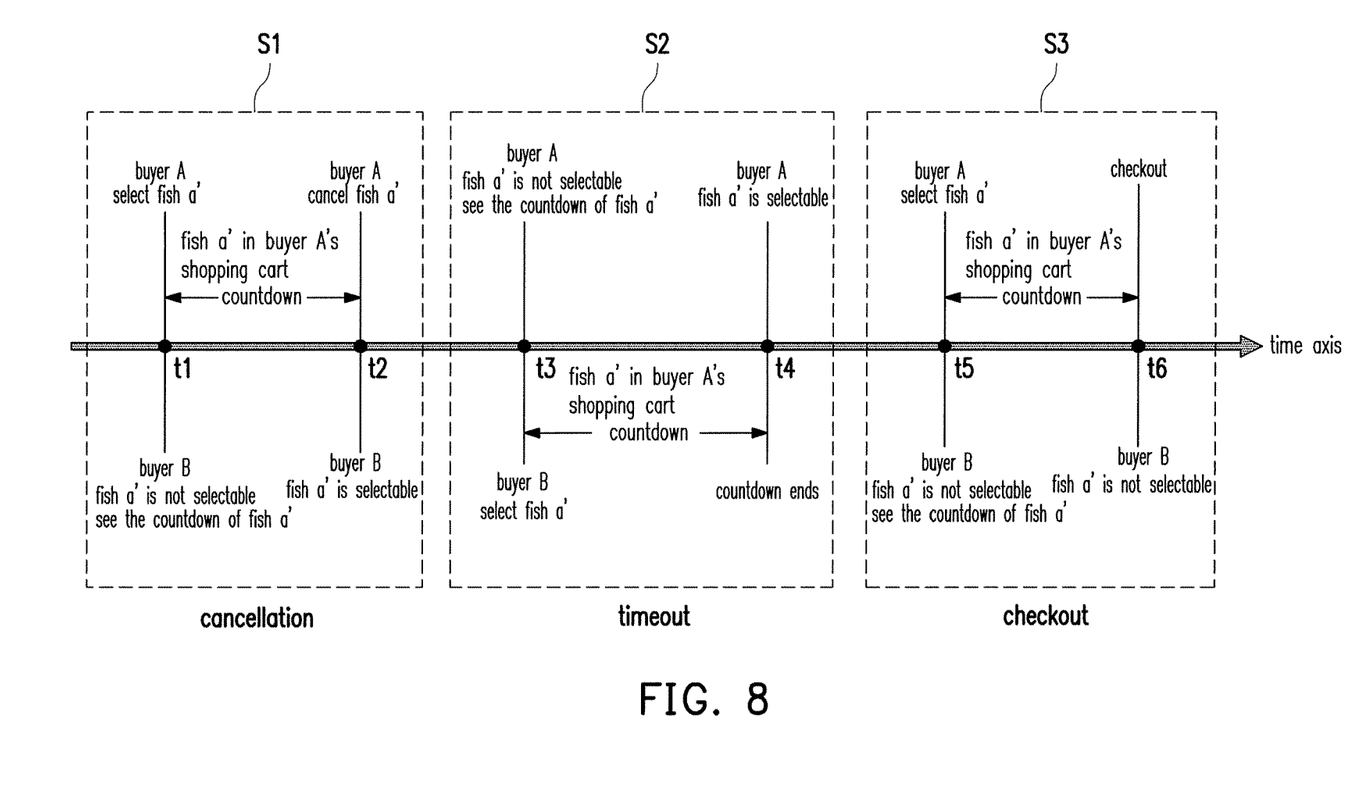
FIG. 8 illustrates a schematic diagram of a scenario of ordering an item in accordance with an exemplary embodiment of the disclosure.

For example, FIG. 8 illustrates a schematic diagram of a scenario of ordering an item in accordance with an exemplary embodiment of the disclosure, where three stages would be presented with respect to a time axis.

Referring to FIG. 8, a scenario S1 describes an order cancellation of an item, and the item herein would be a pet fish. Assume that a buyer A selects a fish a' at a time point t1. The fish a' would now be added to a shopping cart of the buyer A, and a countdown begins. During the countdown, the buyer A and the buyer B would both see the time of the countdown, and the buyer B would not be able to select the fish a'. When the buyer A cancels the fish a' from the shopping cart before a time point t2 at which the countdown ends, the countdown would be canceled, and the buyer B would be able to select the fish a'.

A scenario S2 describes a checkout timeout of an item. Assume that the buyer B selects the fish a' at a time point t3. The fish a' would now be added to a shopping cart of the buyer B, and a countdown begins. During the countdown, the buyer A and the buyer B would both see the time of the countdown, and the buyer A would not be able to select the fish a'. When the buyer B has not yet checked out before a time point t4 at which the countdown ends, the fish a' would be removed from the shopping cart of the buyer B, and the buyer A would be able to select the fish a'.

A scenario S3 describes a checkout timeout of an item. Assume that the buyer A selects the fish a' at a time point t5. The fish a' would now be added to a shopping cart of the buyer A, and a countdown begins. During the countdown, the buyer A and the buyer B would both see the time of the countdown, and the buyer B would not be able to select the fish a'. When the buyer A checks out before a time point t6 at which the countdown ends, the buyer B would no longer be able to select the fish a'.

Figure 9:
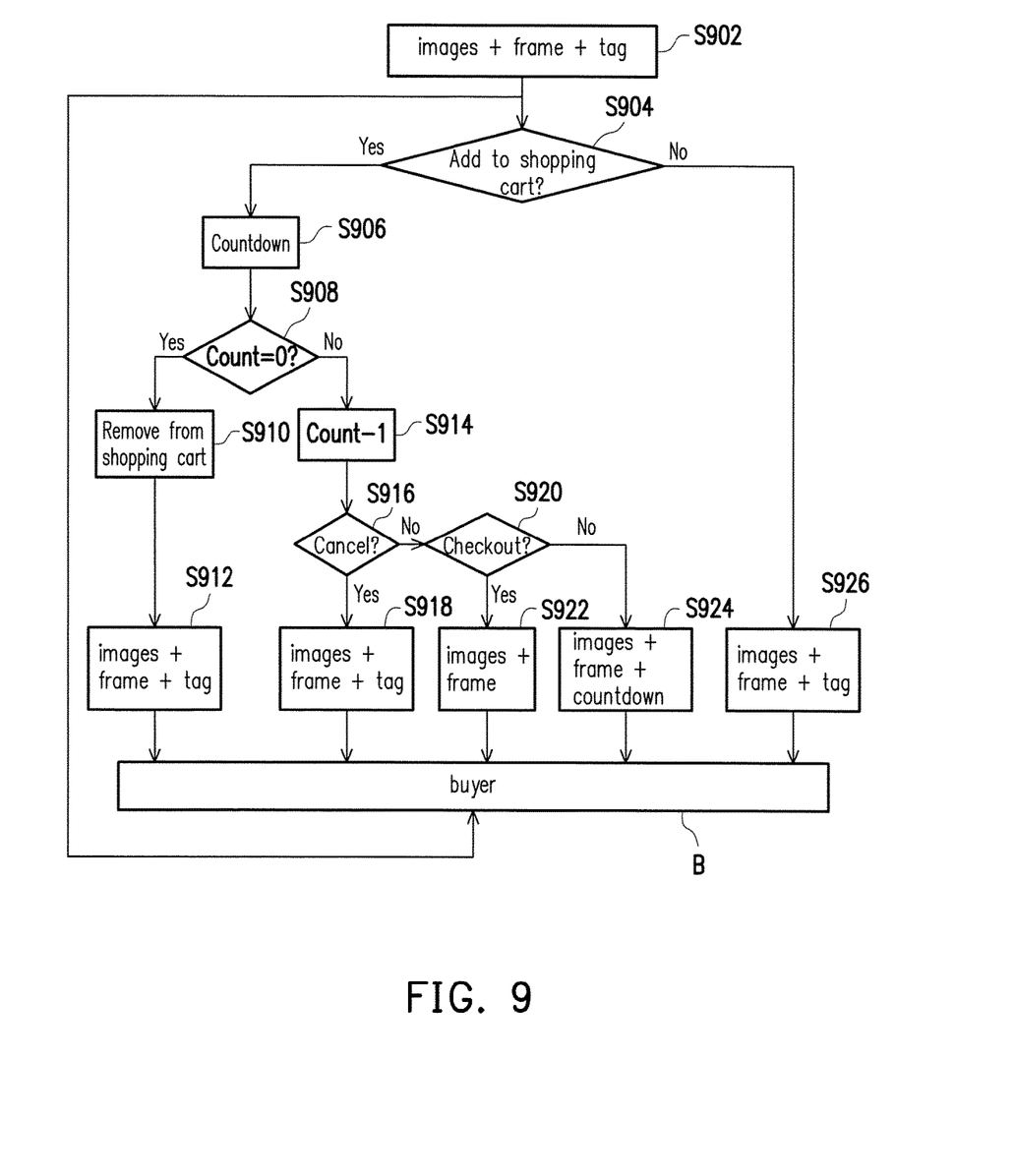
FIG. 9 illustrates a flowchart of ordering an item in accordance with an exemplary embodiment of the disclosure.

FIG. 9 illustrates a flowchart of ordering an item in accordance with an exemplary embodiment of the disclosure.

Referring to FIG. 9, the server 100 would transmit images, a frame, and a tag to a buyer (Step S902) and determine whether the buyer adds any fish to a shopping cart (Step S904). When the buyer adds a fish to the shopping cart, the server 100 would initiate a countdown (Steps S906-S908). During the countdown (Step S914), the server 100 would determine whether the buyer has cancelled the fish (Step S916) or checked out (Step S920). If both no, the server 100 would transmit images, the frame, and the countdown time to the buyer (Step S924), and no tag would be allowed to selected temporarily. During the countdown, when the server 100 determines that the buyer has canceled the fish, it would now transmit the images, the frame, and the tag to the buyer (Step S918). During the countdown, when the server 100 determines that the buyer has checked out, it would transmit the images and the frame (Step S922), and no tag would be displayed and allowed to be selected. When the server 100 determines that the countdown ends, it would remove the fish from the shopping cart and start transmitting images, the frame, and the tag (Step S912) to the buyer again.

Figure 10:
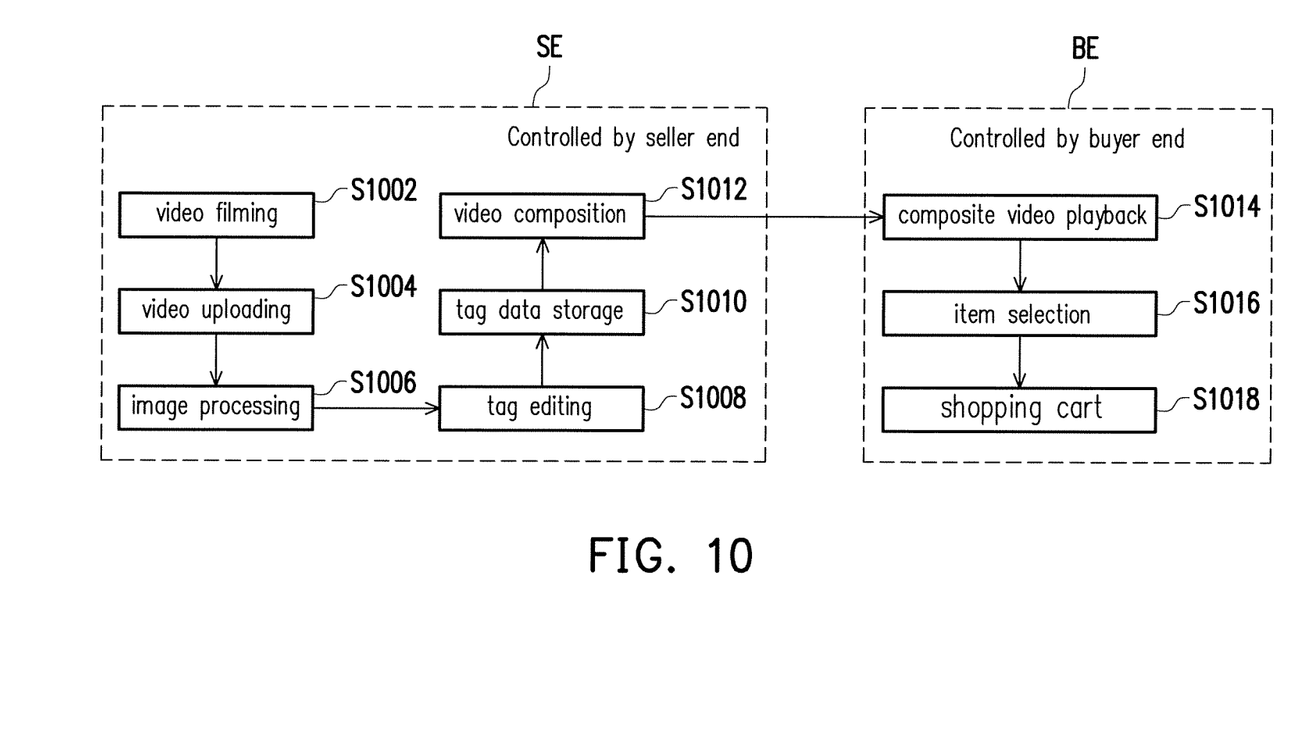
FIG. 10 illustrates a flowchart of an application scenario of a method of supplying and ordering items in accordance with an exemplary embodiment of the disclosure.

FIG. 10 illustrates a flowchart of an application scenario of a method of supplying and ordering items in accordance with an exemplary embodiment of the disclosure. The method herein may also be implemented by the server 100.

Referring to FIG. 10, the server 100 would provide a shopping platform, and a seller end SE would be a live end. After the seller end SE logs into the shopping platform, it would perform video filming on an aquarium by using a camera (Step S1002) and upload the video filmed by the camera to the shopping platform for selling pet fishes (Step S1004). After the server 100 obtains the video, it would perform image processing on the video (Step S1006). Herein, the server 100 would distinguish objects from the video such as clownfishes, corals, landscaping stones, identify each of the items to generate and save its features, frame, and tag as well as their association.

In the present exemplary embodiment, assume that the seller end SE wishes to sell the clownfishes, and the shopping platform would provide the seller end SE to perform tag editing on the clownfishes (Step S1008) so as to allow the seller end SE to input or amend the names for display and descriptions related to the tags. For example, assume that there exist multiple clownfishes in the video. The seller end SE would be able to amend the tags of the clownfishes to a clownfish A, a clownfish B, and a clownfish C as well as input their prices. Moreover, the seller end SE would also be allowed to amend the descriptions of the tags to add other information such as feeding requirements of clownfishes.

The server 100 would store the obtained tag data (Step S1010) for the follow-up steps. Next, the server 100 would perform video composition on the tags, the frames, and the uploaded video and perform feature tracking on the composite video so that the tags would be fixed aside to their corresponding clownfishes. When any of the clownfishes is obstructed by a landscaping stone, the server would adjust the position of the tag. Although such obstructed clownfish does not appear in the composite video, its tag would stay at the position before it is obstructed by the landscaping stone. Therefore, a buyer end BE, also considered as a viewing end, would be able to know the existence of such clownfish behind the landscaping stone when the composite video is being played (Step S1014). When such clownfish moves away from the landscaping stone, the server 100 would be able to identify its features and move the tag aside to such clownfish.

When the buyer end BE logs into the shopping platform, it may view the composite video by typing keywords or suggested by the shopping platform. When the buyer end BE clicks on the tag of a clownfish in the composite image, the server 100 would receive a clicked signal from the buyer end BE and display the description of the clownfish. When the buyer end BE clicks on the clownfish (i.e. the frame on the top layer), the server 100 would delete the tag, record the clownfish selected by the buyer end BE, and remove the tag of the clownfish from the composite image.

When the buyer end BE denies the selection of the clownfish, the server 100 would receive a denied signal, delete the buyer end's BE merchandize selection, and again display the tag in the composite image. On the other hand, when the buyer end BE confirms the selection of the clownfish (Step S1016), the server 100 would receive a confirmed signal, convert the tag data of the clownfish to a shopping cart data format so as to add the clownfish to the shopping cart of the buyer end BE (Step S1018), and delete the tag and the frame of the clownfish so as to set the clownfish to be unselectable. Next, the server 100 would perform a determination mechanism similar to that in FIG. 8 or FIG. 9 before the buyer end BE checks out. Detailed description may refer to previous paragraphs and would not be provided herein for brevity sake.

In view of the aforementioned descriptions, the methods for supplying, ordering, and transacting items based on motion images in the disclosure would allow an ordering end user to view motion images and related information of items provided by a supplier through techniques such as video stream, tagging, behaviour definition, and order list so that the ordering end user would be able to place an order of the items directly through the motion images. The disclosure may be extended to a buy-sell transaction of living species on a network platform in a more intuitive and convenient fashion as compared with conventional physical stores.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for supplying items based on motion images, applicable to a server communicated with a first electronic device and a second electronic device, wherein the method comprises the following steps:
    receiving a first video stream from the first electronic device;
    identifying at least one item from the first video stream and generating a frame and a tag associated with each of the at least one item, wherein the at least one item is a living species and comprises a first item, and wherein the first item is associated with a first frame and a first tag;
    receiving an editing operation performed on the first tag from the first electronic device to generate first tag data;
    combining the first tag and the first frame into the first video stream according to positions of the first item in the first video streams to generate a composite video stream; and
    transmitting the composite video stream to the second electronic device to provide the second electronic device to order the first item through the composite video stream, wherein the first item presented in the first video stream, the first item presented in the composite video stream received by the second electronic device, and the first item to be ordered by the second electronic device is a same unique item.

2. The method according to claim 1, wherein the step of identifying the at least one item from the first video stream comprises:
    distinguishing a plurality of objects in the first video stream; and
    identifying a plurality of features of the objects to extract the at least one item from the objects.

3. The method according to claim 1, wherein the step of receiving the editing operation performed on the first tag from the first electronic device to generate the first tag data comprises:
    in response to a selecting operation performed on the first item by the first electronic device being detected, receiving the first tag data of the first item from the first electronic device and associating the first tag data with the first tag.

4. The method according to claim 1, wherein the step of combining the first tag and the first frame into the first video stream according to the positions of the first item in the first video streams to generate the composite video stream comprises:
    obtaining a moving trajectory of the first item in the first video stream; and
    setting positions of the first tag in the first video stream according to features and the moving trajectory of the first item to accordingly combine the first tag and the first frame into the first video stream accordingly, wherein the first tag is at least close to the first item.

5. The method according to claim 4 further comprising:
    in response to a portion or an entire of the first item disappearing from a specific image of the first video stream, setting a position of the first tag in a previous image of the specific image as a position of the first tag in the specific image; and
    in response to the first item reappearing in another specific image in the first video stream, setting first tag in the another specific image to be at least close to the first item.

6. The method according to claim 1, wherein the first frame is an interactive object that is invisible and associated with ordering the first item, and wherein the step of combining the first tag and the first frame into the first video stream according to the positions of the first item in the first video stream to generate the composite video stream further comprises:
    setting positions of the first frame in the first video stream according to features and the moving trajectory of the first item and associating the first frame with the features to accordingly combine the first tag and the first frame into the first video stream, wherein the first frame is overlapped with and at least surrounding the first item.

7. The method according to claim 6 further comprising:
    in response to a portion or an entire of the first item disappearing from a specific image in the first video stream, setting a position of the first frame in a previous image of the specific image as a position of the first frame in the specific image; and
    in response to the first item reappearing in another specific image in the first video stream, setting the first frame in the another specific image to be overlapped with the first item.

8. The method according to claim 1, wherein the first tag data comprises a name and a related description of the first item.

9. A method for ordering items based on motion images, applicable to a server communicated with a first electronic device and a second electronic device, wherein the method comprises the following steps:

transmitting a composite video stream to the second electronic device, wherein the composite video steam is generated by identifying a first item from a first video stream provided by the first electronic device to generate a first frame and a first tag having first tag data followed by associating and combining the first frame and the first tag into the first video stream, wherein the first item is a living species; and in response to an ordering operation performed on the first item by the second electronic device being detected, generating first ordering data according to the first tag data so as to add the first item to an order list of the second electronic device, wherein the first item presented in the composite video stream received by the second electronic device and the first item added to the order list of the second electronic device is a same unique item.

10. The method according to claim 9, wherein the sever is further communicated with a third electronic and transmits the composite video stream to the third electronic device, wherein in response to the first item being added to an order list of the second electronic device, the method further comprises:

not allowing an order operation to be performed on the first item by the third electronic device and counting down an allowed time of the first item being added to the order list;

in response to a cancellation operation performed on the first item by the second electronic device being detected during counting down the allowed time, removing the first item from the order list and allowing the order operation to be performed on the first item by the third electronic device; and in response to the order list not being sent out by the second electronic device before the allowed time ends, removing the first item from the order list and allowing the order operation to be performed on the first item by the third electronic device.

11. The method according to claim 10, wherein the step of not allowing the order operation to be performed on the first item by the third electronic device comprises:

removing the first tag or the first frame from the composite video stream transmitted to the second electronic device and the third electronic device.

12. The method according to claim 10, wherein during counting down the allowed time, the method further comprises:

displaying a countdown prompt message in the composite video stream transmitted to the second electronic device and the third electronic device.

13. The method according to claim 12, wherein in response to the order list not being sent out by the second electronic device before the allowed time ends, the method further comprises:

removing the countdown prompt message from the composite video stream transmitted to the second electronic device and the third electronic device.

14. The method according to claim 9, wherein a portion of the first tag data is displayed on the first tag, and wherein in response to the composite video stream being sent to the second electronic device, the method further comprises:

in response to a selecting operation performed on the first item by the second electronic device being detected, displaying another portion of the first tag data on the first tag in the composite video stream transmitted to the second electronic device.

15. The method according claim 9, wherein the step of detecting the ordering operation performed on the first item by the second electronic device comprises:

detecting a selecting operation performed on the first frame by the second electronic device.

16. The method according to claim 15, wherein in response to the ordering operation performed on the first item by the second electronic device being detected, the method further comprises:

removing the first tag and the first frame from the composite video stream;

performing a confirmation of the ordering operation with the second electronic device;

in response to the confirmation being yes, deleting an association between the first tag and the first frame respectively with the first item;

in response to the confirmation being no, restoring the first tag and the first frame to the composite video stream.

17. A method for transacting items based on motion images, applicable to a server communicated with a first electronic device and a second electronic device, wherein the method comprises the following steps:

receiving a first video stream from the first electronic device;

identifying at least one item from the first video stream and generating a frame and a tag associated with each of the at least one item, wherein the at least one item is a living species and comprises a first item, and wherein the first item is associated with a first frame and a first tag;

receiving an editing operation performed on the first tag from the first electronic device to generate first tag data;

associating and combining the first tag and the first frame into the first video stream according to positions of the first item in the first video streams to generate a composite video stream; and transmitting the composite video stream to the second electronic device; and in response to an ordering operation performed on the first item by the second electronic device being detected, generating first ordering data according to the first tag data so as to add the first item to an order list of the second electronic device, wherein the first item presented in the first video stream, the first item presented in the composite video stream received by the second electronic device, and the first item added to the order list of the second electronic device is a same unique item.

18. The method according to claim 17, wherein before the step of transmitting the composite video stream to the second electronic device, the method further comprises:

verifying a buyer's identity of the second electronic device.

19. The method according to claim 18, wherein the step of transmitting the composite video stream to the second electronic device comprises:

receiving an ordering request on the at least one item from the second electronic device; and transmitting the composite video stream to the second electronic device according to the ordering request.

20. The method according to claim 18, wherein the step of transmitting the composite video stream to the second electronic device comprises:

pushing the composite video stream to the second electronic device.

* * * * *